(12) United States Patent
Weber

(10) Patent No.: US 7,930,868 B1
(45) Date of Patent: Apr. 26, 2011

(54) OPTICAL DISC ADVERTISING LABEL AND METHOD

(76) Inventor: Warren D. Weber, Edmonds, WA (US)

( * ) Notice: Subject to any disclaimer, the term of this patent is extended or adjusted under 35 U.S.C. 154(b) by 1136 days.

(21) Appl. No.: 11/485,696

(22) Filed: Jul. 13, 2006

Related U.S. Application Data

(60) Provisional application No. 60/699,423, filed on Jul. 13, 2005.

(51) Int. Cl.
*B65B 61/00* (2006.01)
(52) U.S. Cl. ............ 53/415; 53/445; 53/474; 206/308.1
(58) Field of Classification Search .................... 53/411, 53/410, 415, 428, 445, 449, 474, 129.1, 111 R, 53/131.1, 135.1, 170; 206/308.1, 309, 312
See application file for complete search history.

(56) References Cited

U.S. PATENT DOCUMENTS

| | | | | | |
|---|---|---|---|---|---|
| 3,107,783 | A | * | 10/1963 | Corey et al. .................... | 206/310 |
| 4,385,460 | A | * | 5/1983 | Hanna .............................. | 40/340 |
| 4,583,765 | A | * | 4/1986 | Messinger ....................... | 462/18 |
| 4,846,504 | A | * | 7/1989 | MacGregor et al. .......... | 283/102 |
| 4,973,088 | A | * | 11/1990 | Levy ................................ | 283/81 |
| 5,195,265 | A | * | 3/1993 | Klingenberg ................... | 40/638 |
| 5,543,001 | A | * | 8/1996 | Casillo et al. ................... | 156/60 |
| 5,597,634 | A | * | 1/1997 | Bloomer et al. .............. | 428/40.1 |
| 6,042,149 | A | * | 3/2000 | Roshkoff ........................ | 283/67 |
| 6,360,466 | B1 | * | 3/2002 | Thomas, III .................... | 40/638 |
| 6,363,987 | B1 | * | 4/2002 | Koch .............................. | 156/391 |
| 6,511,731 | B2 | * | 1/2003 | Clark ............................. | 428/136 |
| 6,516,852 | B1 | * | 2/2003 | Sandor ........................... | 156/391 |
| 6,564,844 | B1 | * | 5/2003 | Grossman ...................... | 156/391 |
| 6,594,927 | B2 | * | 7/2003 | Witkowski ...................... | 40/310 |
| 6,670,015 | B1 | * | 12/2003 | Hanson ......................... | 428/64.4 |
| 6,673,408 | B1 | * | 1/2004 | Roth ............................. | 428/40.1 |
| 6,689,238 | B2 | * | 2/2004 | Barnet ............................ | 156/60 |
| 6,955,843 | B2 | * | 10/2005 | Flynn et al. ................... | 428/40.1 |
| 7,357,249 | B1 | * | 4/2008 | Weber ......................... | 206/308.1 |
| 7,694,710 | B2 | * | 4/2010 | Hong ............................. | 156/556 |
| 2004/0016209 | A1 | * | 1/2004 | Roth .............................. | 53/411 |

* cited by examiner

*Primary Examiner* — Paul R Durand
(74) *Attorney, Agent, or Firm* — Dean A. Craine

(57) ABSTRACT

An optical disc advertising and security method that includes the use of a promotional label that is coaxially aligned and adhesively attached to the top surface of an optical disc. The promotional label includes an upper label layer and a lower label layer. Attached to each layer is a laterally extending tab. Printed on the top layer surface of each label layer is promotional indicia. In one embodiment, the upper label layer is slightly larger in diameter than the lower label layer so that the lower label is covered and hidden from view by the upper label layer. In a second embodiment, the promotional label is made of two label layers permanently adhesively attached together with a RFID tag disposed between them.

1 Claim, 3 Drawing Sheets

OPTICAL DISC ADVERTISING LABEL AND METHOD

This is a utility patent application which claims benefit of U.S. Provisional Application No. 60/699,423 filed on Jul. 13, 2005.

BACKGROUND OF THE INVENTION

1. Field of the Invention

This invention relates to marketing and advertising methods and more particularly to such methods used with optical disc media.

2. Description of the Related Art

Audio optical discs are often distributed in plastic containers, called jewel boxes. Jewel boxes typically include a transparent plastic front and back leaves that are pivotally connected together along one edge. Formed along the top and bottom edges and on the inside surface of the front leaf are small ears designed to hold a flat card or booklet on the front leaf that can be seen when the container is closed.

Recently, video game and movie manufactures have began distributing video optical discs in black or dark, plastic, book-like containers, hereinafter called 'book containers.' 'Book containers' typically include two leaves connected together with an integrally formed hinge. Formed on the inside surface of the back leaf is a circular, recessed cavity designed to receive a standard 5¼ inch diameter optical disc. Formed centrally in the recessed cavity may be an upward extending peg that is inserted into the optical disc's spindle hole when the disc is placed within the recessed cavity.

In the inventor's provisional patent application, entitled 'Optical Disc Media Container and Marketing Method' filed on Jan. 14, 2005 (Ser. No. 60/644,462), a marketing method is disclosed in which an optical disc is held in its original orientation inside the outer container after being manufactured. An inner cover is placed over the optical disc when it is placed inside the recessed cavity that prevents the optical disc from rotating inside the outer container. When the outer container is opened to remove the optical disc, the printed surface on the optical disc becomes visible and plays an important role in the overall marketing of the optical disc.

Game and movie optical disc manufacturers typically cover the outer surfaces on the leaves on a 'box container' with advertisements. Such advertisements are covered by a thick, transparent plastic film designed to protect and hold the advertisement in place on the surface. Printed on the advertisement may be words or images showing the main characters, or some theme in the game or movie.

Printed on the top surface on an optical disc is the title of the game or movie, the name of the producer and distributor, the name of the artists or actors, and any trademarks and other promotional elements associated with the optical disc. Also printed on the top surface are images and graphic elements that match or compliment the images and graphic elements on the outer surfaces on the jewel box or 'box container'.

Removable labels that are attached to the outside surface of a retail product to help promote the product are very popular. Such labels are printed in contrasting colors designed to draw the consumer's attention to the product. Such labels can also be used as redeemable coupons or proof of purchase coupons. They can also be used to promote the sale of a second product and service usually associated with the product.

Most consumer's initially opening an optical disc container to remove an optical disc from the container with great interest and anticipation. Because the consumer's attention is already drawn to the optical disc, attaching removable labels over the optical disc that must be removed in order for the optical disc to be removed from the container would be highly effective.

Theft, of course, is a major problem in the retail industry. One method used to reduce retail theft is to place a radio frequency identification device, known as an RFID tag, inside the shipping container which activates an alarm if taken through a detection zone. Heretofore, RFID tags have been placed inside the jewel box or inside the 'box container' to prevent theft of an optical disc. Recently, thieves have discovered their location and are now breaking into the jewel box or 'box container' to remove the optical disc therefrom while inside the retail business.

What is needed is an improved advertising method for optical discs stored in rigid containers that uses a removable label with promotional indicia printed thereon that selectively attaches to the top surface of the optical disc when stored inside a standard jewel box, or box container. What is also needed is a removable label that includes an optical RFID tag that must be removed from the disc to avoid detection.

SUMMARY OF THE INVENTION

It is an object of the present invention to provide an improved advertising method for optical discs shipped inside a standard shipping container used with optical discs, such as a paper sleeve, a jewel case, or a book container.

It is another object of the present invention to provide a removable promotional label with promotional indicia printed on its top surface that adhesively attaches to the non-recorded surface on an optical disc when placed inside the container.

It is another object of the present invention to provide such a promotional label that includes at least two stacked label layers each with promotional indicia printed thereon, that must be sequentially removed from the optical disc.

It is another object of the present invention to provide such a promotional label that may include an imbedded RFID tag capable of being detected by a detection device.

These and other objects are met by an optical disc advertising method and promotional label disclosed herein that includes at least two stacked label layers designed to removably attach to the top surface of an optical disc. Attached or formed on the perimeter edge of each label layer is a laterally extending tab that can be easily grasped to remove the label layer from the optical disc. Printed on the top surface of each label layer is a promotional indicia designed to enhance sales of the optical disc or a service associated therewith.

In the first embodiment, the promotional label includes two label layers vertically stacked over the top surface of the optical disc. In the preferred embodiment, the sizes of the lower adhesive label and tab attached thereto are sufficiently smaller so that the upper label layer and tab hides the lower label layer and tab. During use, the upper label layer must be removed before the lower label layer can be removed thereby forcing the user to view the promotional indicia on each label layer.

In a second embodiment of the invention, the promotional label includes an upper label layer permanently attached to a lower label layer. A light adhesive is applied to the bottom surface of the lower layer thereby enabling the lower label to be removably attached to the top surface of an optical disc. Promotional indicia is printed on the top surface of the upper label layer which is visible to the user when removing the optical disc from the container. An RFID tag is disposed and hidden from view between the upper and lower layers to prevent theft.

Using the labels described above, a method of advertising on an optical disc is disclosed.

DESCRIPTION OF THE PREFERRED EMBODIMENT(S)

Figure 1:
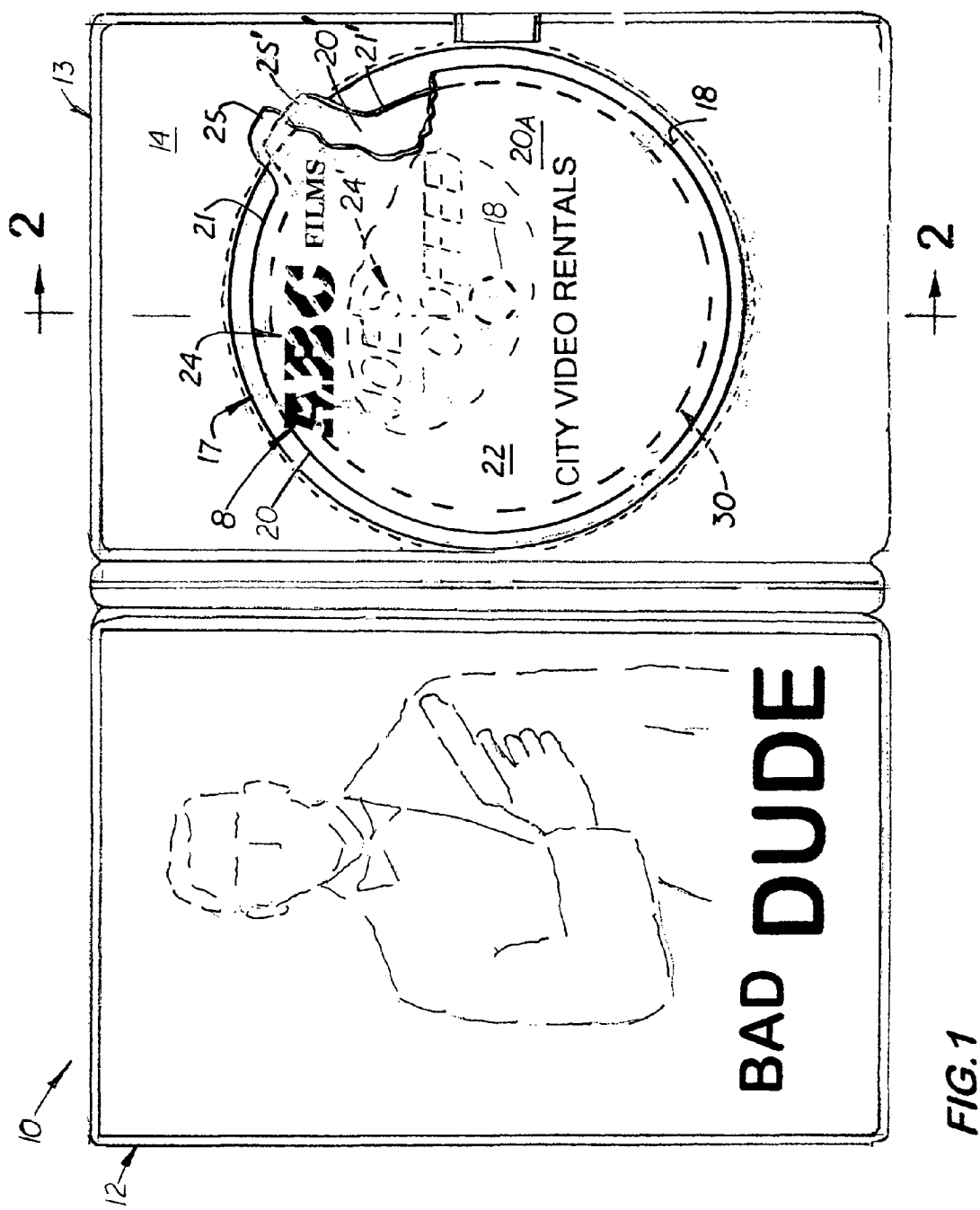
FIG. 1 is a top plan view of an optical disc shown mounted inside a standard optical disc shipping container with a promotional layer made of two label layers stacked and positioned over the optical disc.

Referring to the Figs., there is shown and described herein an optical disc advertising system that includes a promotional label 8 attached to an optical disc 17 that is disposed inside a storage container 10 with two pivotally attached leaves 12, 13. The promotional label 8 includes two label layers 20, 20' stacked over the top surface 18 of the optical disc 17 when stored inside the container 12. Formed on the bottom surface of each label layer 20, 20' is an adhesive layer 22, 22' that temporarily holds the two label layers 20, 20' in a stacked configuration over the optical disc 17. Attached or formed on the perimeter edges 21, 21' of the upper and lower label layers 20, 20' is a laterally extending tab 25, 25', respectively, that can be easily grasped to remove the label layers 20, 20' from the optical disc 17. In the preferred embodiment, the tabs 25, 25' are sufficient in length to extend beyond the perimeter edge of the optical disc 17.

In the preferred embodiment, the body 20A of the upper label layer 20 is circular with the suitable adhesive 22 attached to the bottom surface of the body 20A. An adhesive 22 may or may not be attached to the bottom surface of the tab 25.

Printed on the front surfaces of the adhesive label 20, 20', respectively, are advertisements or other promotional indicia generally indicated as 24, 24' designed to enhance sale of the optical disc 17 or an associated product or service.

Figure 2:
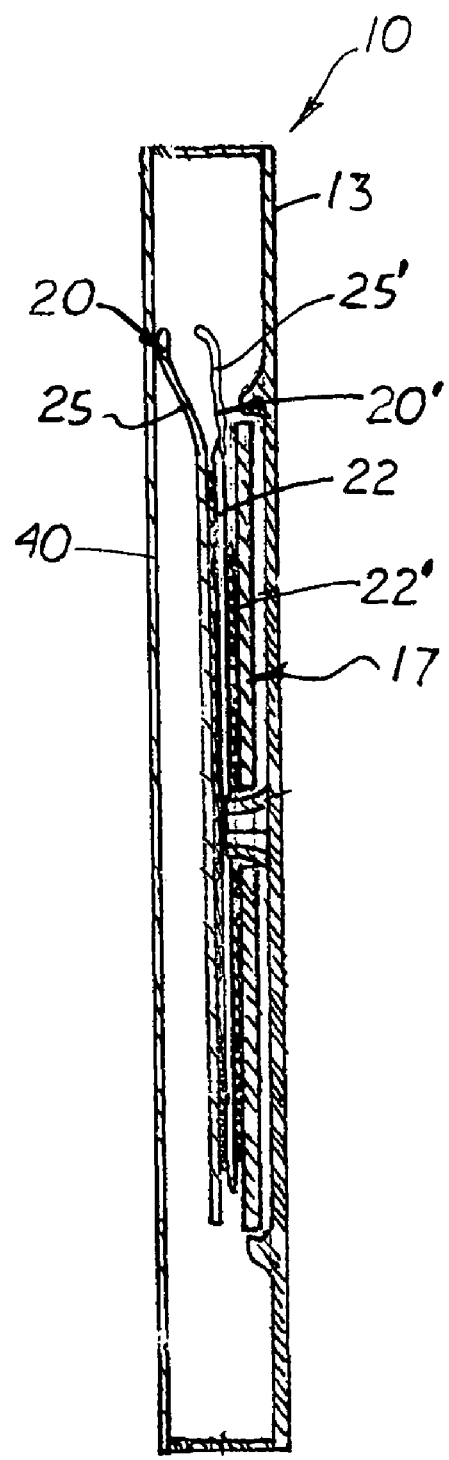
FIG. 2 is a sectional side elevational view of the container taken along line 2-2 in FIG. 1.

As shown in FIG. 2, a plurality of adhesive labels 20, 20' are stacked together over the top surface 18 of the optical disc 17. The size of the adhesive labels 20, 20' and the tabs 25, 25' are sufficient so that the upper label layer 20 hides the lower label layer 20' and tab 25' from view when the container 10 is opened. The perimeter edges of the lower label layer 20' and the tab 25' are covered and hidden by the upper label layer 20 and tab 25 so that the upper label layer 20 must be first removed from the optical disc 17 in order to remove the lower label 20'. Using multiple labels with different promotional indicia 24 printed thereon, advertisers are able to sell different products and services on a single optical disc 17.

Figure 3:
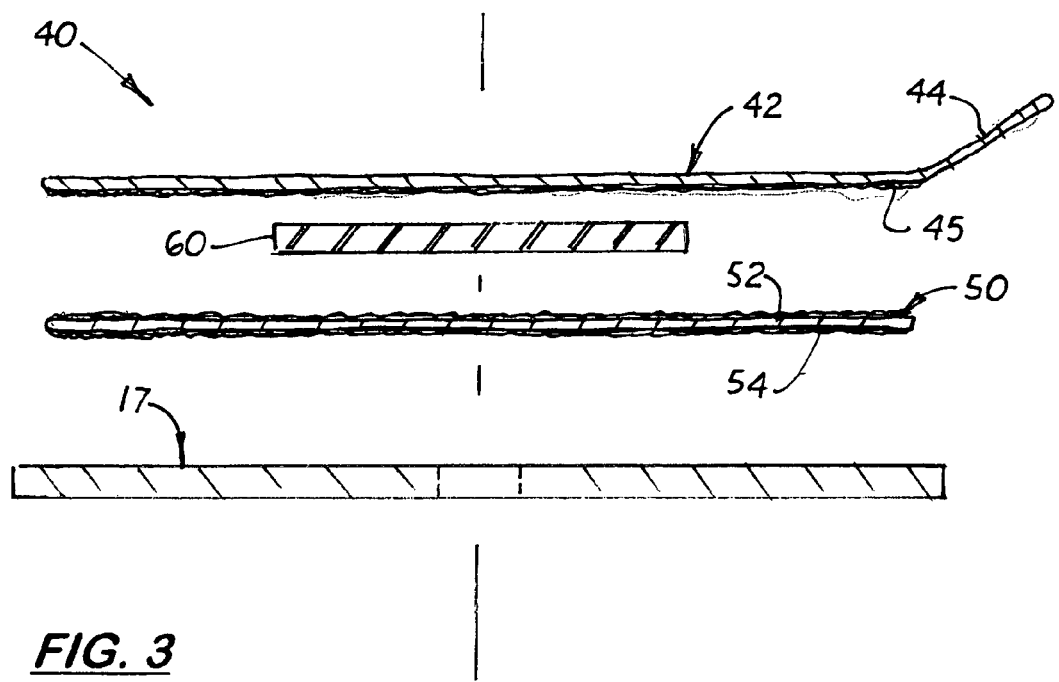
FIG. 3 is a sectional, side elevational view of a second embodiment of the promotional label made of two label layers and a RFID tag placed between them.

In another embodiment of the promotional label as shown (see FIG. 3) in which the lower label layer 50 is permanently attached to the bottom surface of an upper label layer 40. Disposed between the two layers 42 and 50 and hidden from view is an RFID tag 60. A light adhesive 45 is applied to the bottom surface of the upper label layer 42 thereby enabling the lower label layer 42 to be easily attached and removes from the top surface of the upper label 42. A tab 44 is shown attached to the upper label layer 42.

Using the above labels, a method of advertising with an optical disc is provided comprising the following steps:
 a. selecting an optical disc with a top surface;
 b. inserting said optical disc into a storage container so that said top surface is visible;
 c. selecting a removable lower label with a laterally extending tab and promotional indicia printed on the top surface thereon;
 d. coaxially aligning and attaching said lower label over said top surface of said optical disc;
 e. selecting a removable upper label with a laterally extending tab and promotional indicia printed on the top surface thereon; and,
 f. coaxially aligning and attaching said upper label layer over said lower label layer thereby requiring said upper label layer to be removed before said lower label layer can be removed from said optical disc.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A method for advertising with an optical disc shipped in an original storage container, comprising:
 a. selecting an optical disc with a top surface;
 b. inserting said optical disc into a storage container used to ship said optical disc, said optical disc being arranged in said storage container so that its said top faces outward and is visible;
 c. selecting a removable lower label layer with a top surface and a laterally extending tab, said lower label layer having promotional indicia printed on said top surface thereon;
 d. coaxially aligning and attaching said lower label layer over said top surface of said optical disc;
 e. selecting a removable upper label layer with a laterally extending tab, said upper label layer having a top surface with promotional indicia printed thereon, said upper label layer being coaxially aligned over said lower label layer and being sufficient in size to overlap and cover said lower label layer thereby hiding said lower label layer and the promotional indicia printed thereon from view when said said storage container is initially opened;
 f. closing said storage container; and,
 g. distributing said storage container containing said optical disc with said upper label layer and said lower label layer attached thereto.

\* \* \* \* \*

UNITED STATES PATENT AND TRADEMARK OFFICE
CERTIFICATE OF CORRECTION

| | | |
|---|---|---|
| PATENT NO. | : 7,930,868 B1 | Page 1 of 1 |
| APPLICATION NO. | : 11/485696 | |
| DATED | : April 26, 2011 | |
| INVENTOR(S) | : Warren D. Weber | |

It is certified that error appears in the above-identified patent and that said Letters Patent is hereby corrected as shown below:

On Column 4, line 38, insert --surface-- between 'top' and 'faces'.
On Column 4, line 53, delete "said" before 'storage'.

Signed and Sealed this
Ninth Day of August, 2011

David J. Kappos
*Director of the United States Patent and Trademark Office*